US012607407B2

(12) United States Patent
Andor et al.

(10) Patent No.: US 12,607,407 B2
(45) Date of Patent: Apr. 21, 2026

(54) CLOSURE FOR CONCRETE PRODUCTS CURING KILN

(71) Applicant: Besser Company, Alpena, MI (US)

(72) Inventors: Donald Robert Andor, Alpena, MI (US); Zachary Thomas Adrian, Alpena, MI (US)

(73) Assignee: Besser Company, Alpena, MI (US)

( * ) Notice: Subject to any disclaimer, the term of this patent is extended or adjusted under 35 U.S.C. 154(b) by 15 days.

(21) Appl. No.: 18/094,368

(22) Filed: Jan. 8, 2023

(65) Prior Publication Data

US 2023/0243589 A1 Aug. 3, 2023

Related U.S. Application Data

(60) Provisional application No. 63/297,303, filed on Jan. 7, 2022.

(51) Int. Cl.
*F27D 1/18* (2006.01)
*F27D 99/00* (2010.01)
*F27D 9/00* (2006.01)

(52) U.S. Cl.
CPC ....... *F27D 1/1858* (2013.01); *F27D 99/0073* (2013.01); *F27D 1/1866* (2013.01); *F27D 2001/1875* (2013.01); *F27D 2001/1883* (2013.01); *F27D 2009/0081* (2013.01)

(58) Field of Classification Search
CPC .. F27D 1/1858; F27D 1/1866; F27D 99/0073; F27D 2001/1875; F27D 2001/1883; F27D 2009/0081
USPC ........................................................ 432/250
See application file for complete search history.

(56) References Cited

U.S. PATENT DOCUMENTS

| | | | | |
|---|---|---|---|---|
| 4,077,389 A * | 3/1978 | Vogel | F24C 15/021 | 277/637 |
| 4,531,304 A * | 7/1985 | Wauhop, Jr. | F26B 23/002 | 264/37.17 |
| 5,496,012 A * | 3/1996 | Kenny, III | F01D 25/007 | 251/294 |
| 6,017,215 A * | 1/2000 | Lillja | G01R 31/2817 | 110/173 R |
| 2004/0057816 A1* | 3/2004 | Nunemacher | F23G 5/027 | 414/217 |
| 2008/0237379 A1* | 10/2008 | Briggs | B02C 15/04 | 277/300 |

FOREIGN PATENT DOCUMENTS

CN 210282690 U 10/2020

OTHER PUBLICATIONS

European Search Report, EP23150766, Ref N426171EP Mpr, May 15, 2023.

* cited by examiner

*Primary Examiner* — Steven B Mcallister
*Assistant Examiner* — Benjamin W Johnson
(74) *Attorney, Agent, or Firm* — Mechanicus PLLC

(57) ABSTRACT

A concrete products curing kiln and kiln closure apparatus comprising a pressure door shaped to cover an opening of the kiln, and an expandable chamber. The expandable chamber is positioned such that inflation of the chamber causes the chamber to expand and press on, and at least partially seal, the pressure door against a kiln door frame defining the kiln opening.

19 Claims, 6 Drawing Sheets

CLOSURE FOR CONCRETE PRODUCTS CURING KILN

BACKGROUND

Field

This application relates generally to kilns for curing concrete products.

DESCRIPTION OF RELATED ART INCLUDING INFORMATION DISCLOSED UNDER 37 CFR 1.97 AND 1.98

Pressurized kilns used in the curing of concrete products (such as, for example, Carboclave®-type kilns) require a sealable door capable of maintaining pressure within the kiln when closed. Known closure devices for these kilns, such as pressure hatches, or bolted cover plates, tend to be difficult and/or time-consuming to open, and this difficulty scales with the size of the kiln.

SUMMARY

A concrete products curing kiln closure apparatus comprising a kiln opening and a pressure door shaped to cover the kiln opening. The apparatus also comprises an expandable chamber positionable against a kiln door frame defining the kiln opening, such that inflation of the chamber causes the chamber to expand and press on, and at least partially seal, the pressure door against the kiln door frame, when the pressure door is covering the kiln opening.

A concrete products curing kiln comprising a kiln opening and a pressure door shaped to cover the kiln opening. The kiln also comprises an expandable chamber positionable against a kiln door frame defining the kiln opening, such that inflation of the chamber causes the chamber to expand and press on, and at least partially seal, the pressure door against the kiln door frame, when the pressure door is covering the kiln opening.

DRAWING DESCRIPTIONS

These and other features and advantages will become apparent to those skilled in the art in connection with the following detailed description and appended drawings of one or more embodiments of the invention, in which.

DETAILED DESCRIPTION

Figure 1:
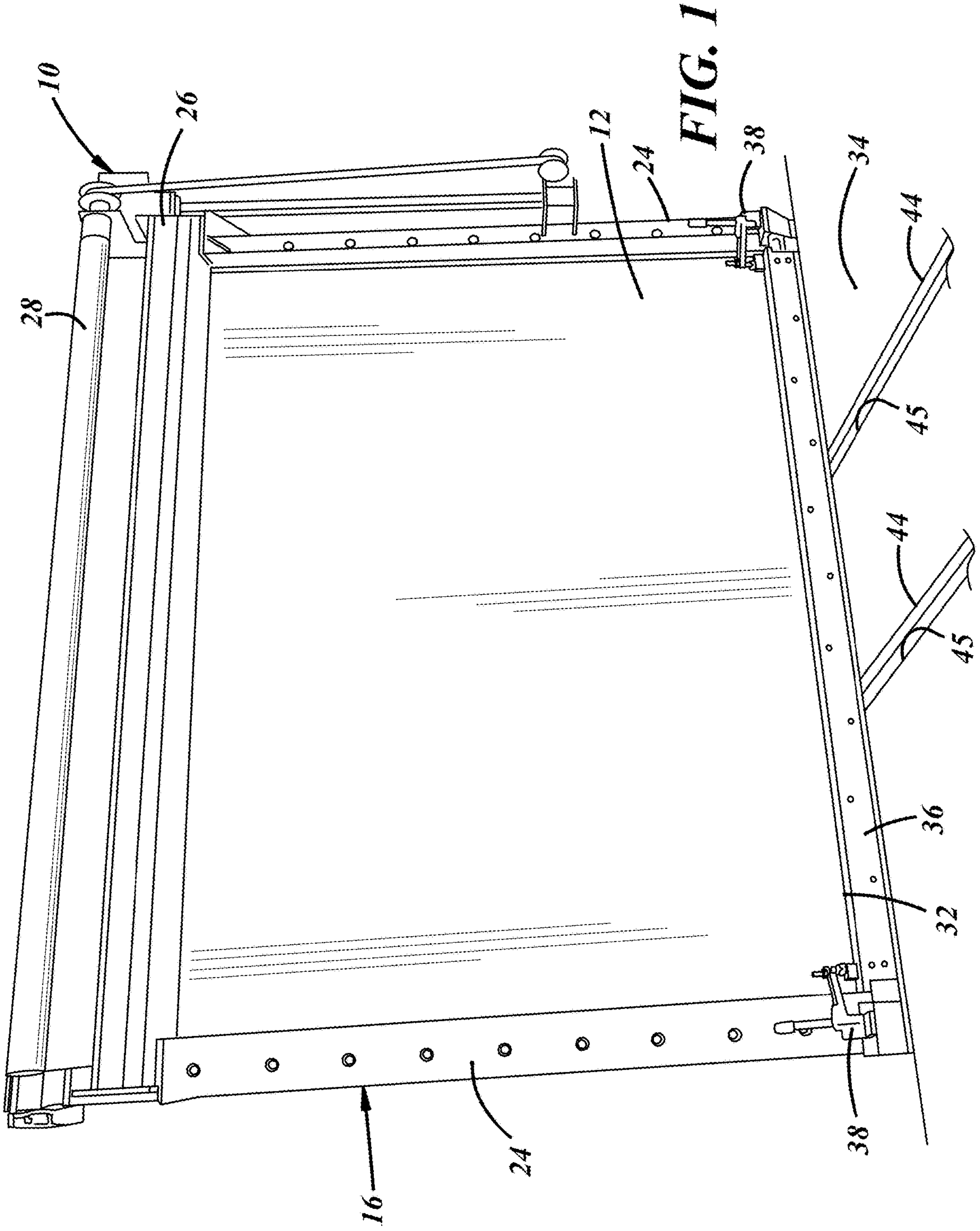
FIG. 1 is a perspective view of a concrete products kiln shown with an opening of the kiln closed by a kiln closure apparatus.
Figure 3:
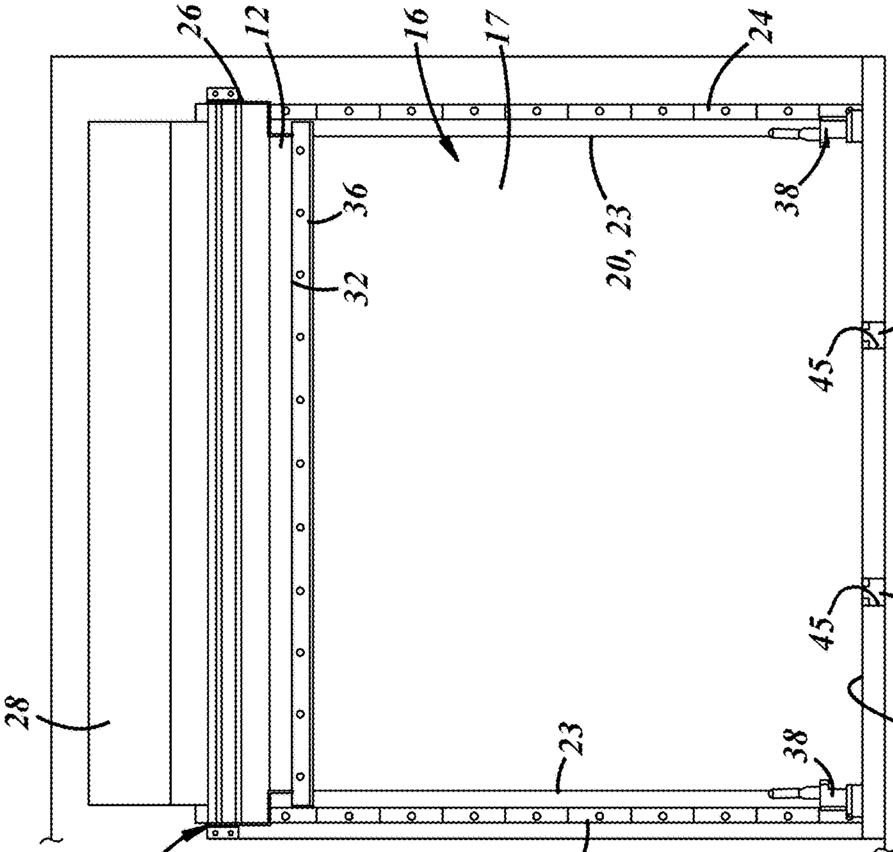
FIG. 3 is a simplified front view of the kiln of FIG. 2, showing the kiln closure apparatus door retracted, exposing an interior of the kiln.
Figure 2:
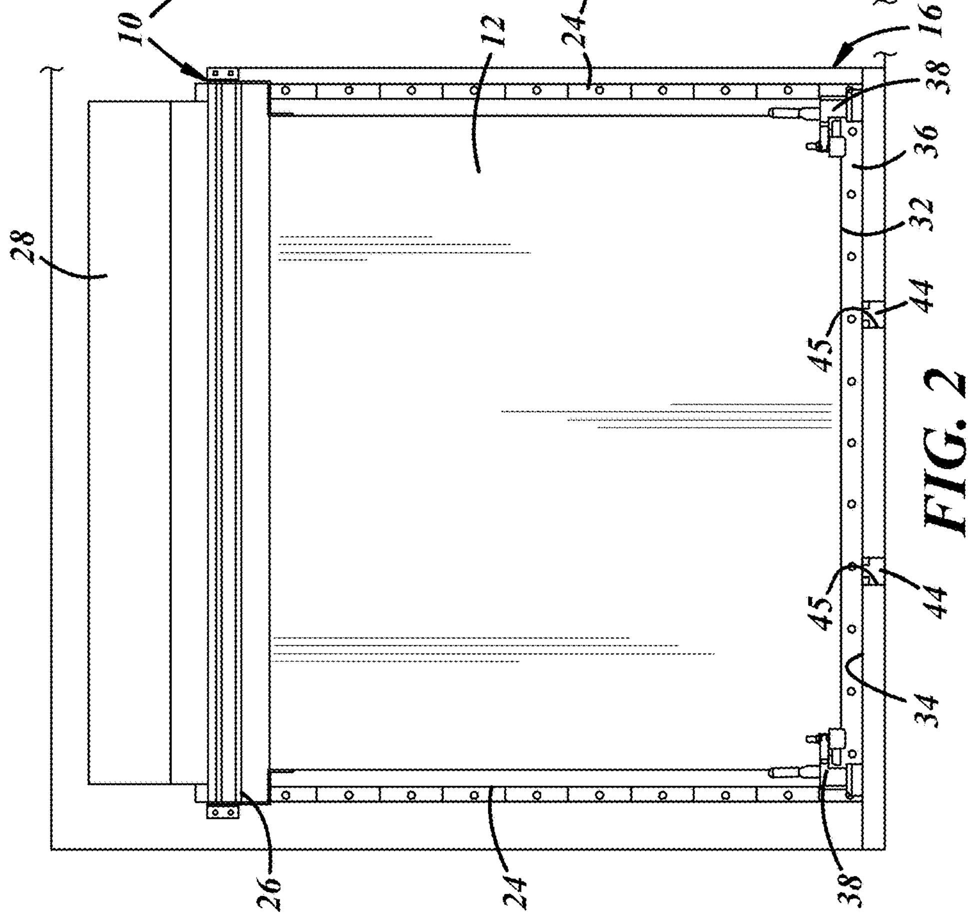
FIG. 2 is a simplified front view of the kiln of FIG. 1, showing a door of the kiln closure apparatus shut and clamped to a floor surface adjacent the kiln.

Various embodiments of a closure apparatus for a concrete products curing kiln are generally indicated in the Figures at 10. The kiln closure apparatus 10 may comprise a pressure door 12 shaped to cover an opening 14 of a kiln 16, as best shown in FIGS. 1-3, and an expandable chamber 18 positioned such that inflation of the chamber 18 causes the chamber 18 to expand and press on, and at least partially seal, the pressure door 12 against a kiln door frame 20 defining the kiln opening 14, as best shown in FIGS. 7-11. The closure apparatus 10 may be configured to seal the kiln opening 14 sufficiently to allow a positive gas pressure to be maintained within the kiln 16, relative to ambient air pressure outside the kiln 16.

Figure 4:
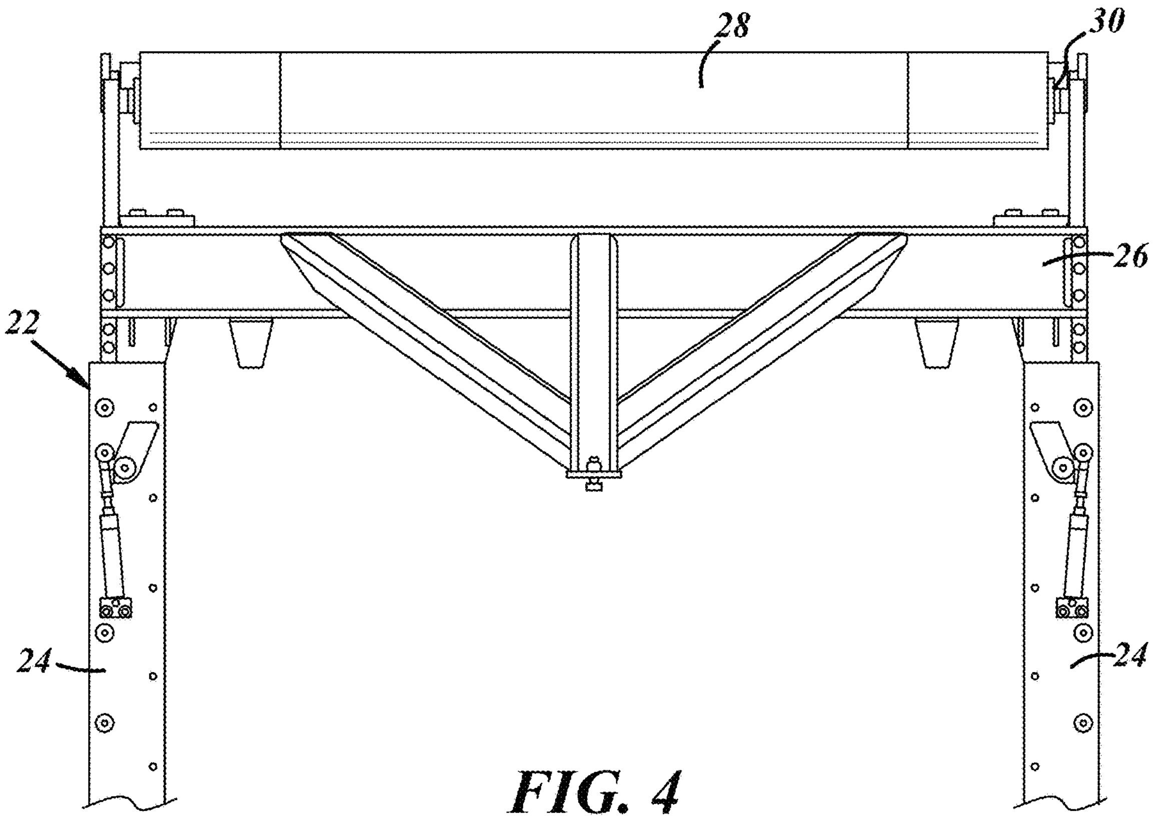
FIG. 4 is a detail view of an upper half of kiln closure frame of the closure apparatus including a spool for storing the door when the door is retracted.
Figure 7:
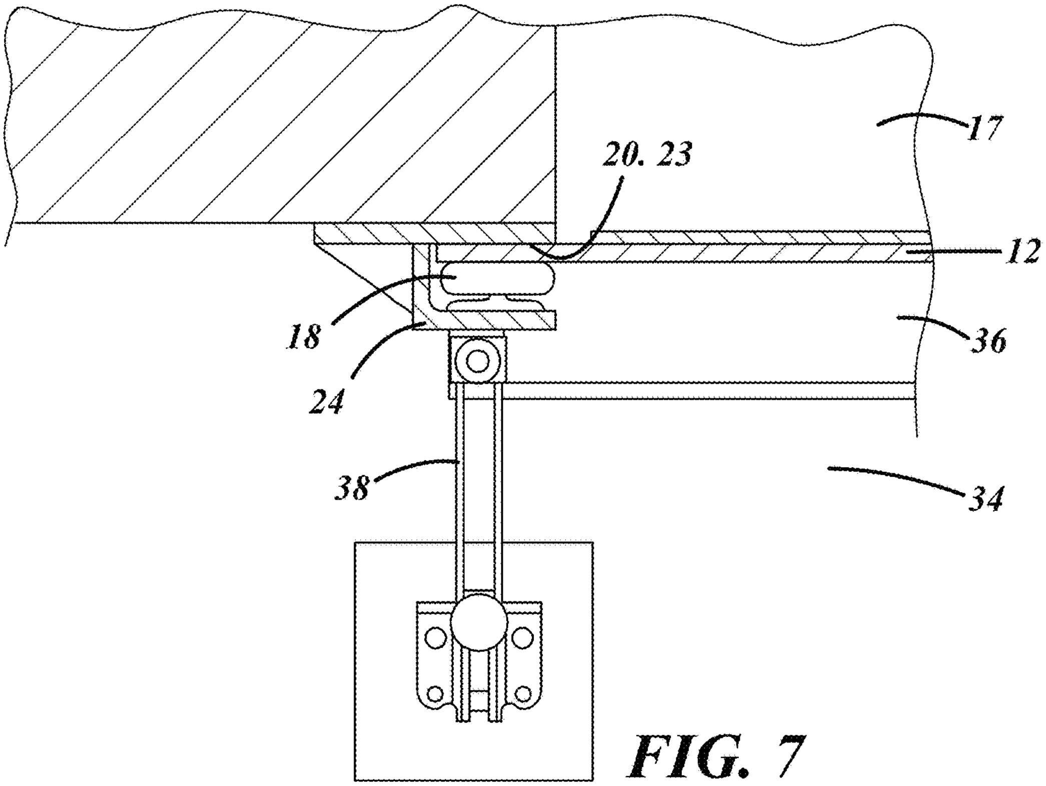
FIG. 7 is a top-down cross-section view of one side of the kiln closure apparatus, showing an inflated chamber clamping the kiln closure apparatus door against a door frame of the kiln.
Figure 8:
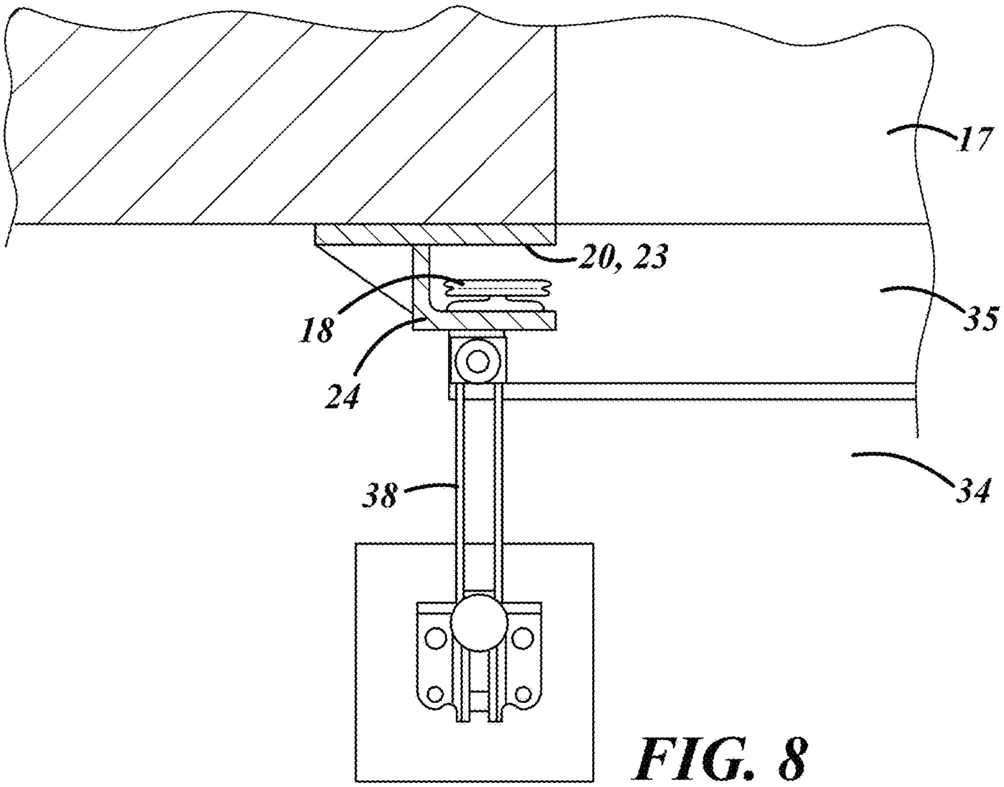
FIG. 8 is a top-down view of the kiln closure apparatus portion of FIG. 7, showing the door retracted and the chamber deflated.
Figure 9:
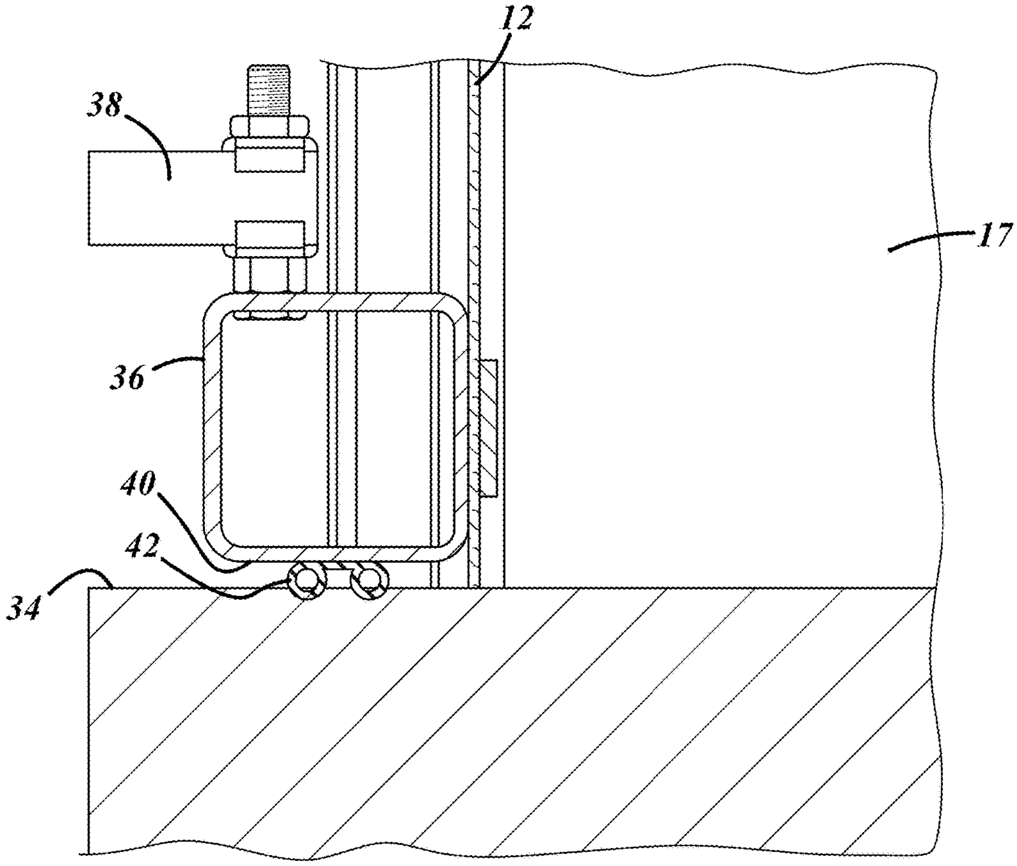
FIG. 9 is a cross-sectional side view of the bottom bar of FIG. 5.
Figure 10:
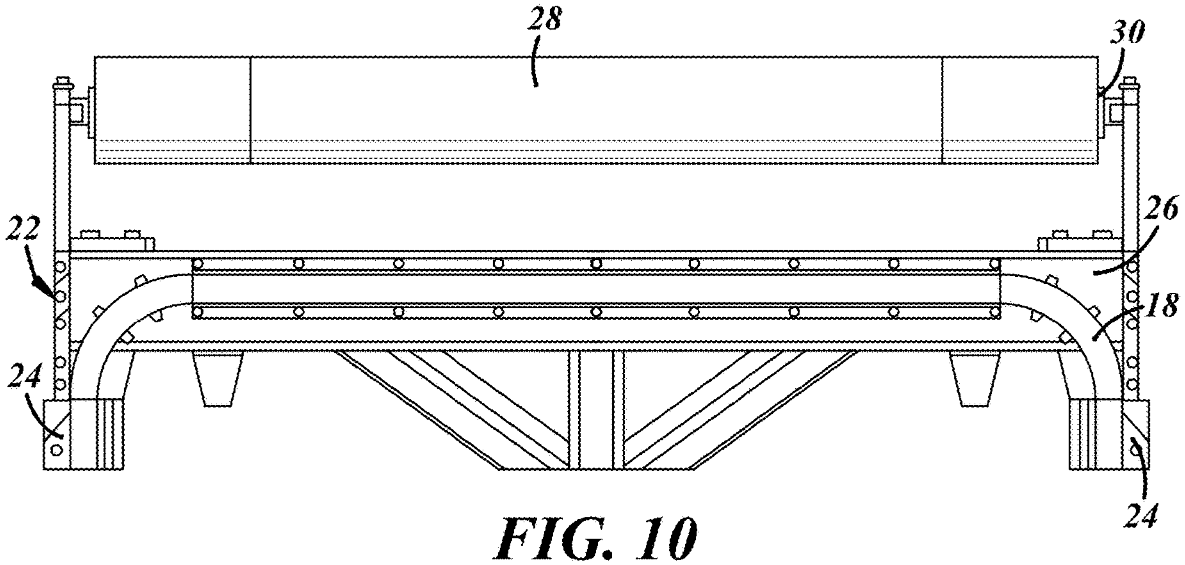
FIG. 10 is a detail view of the opposite (inner) side of the upper half of the kiln closure frame of FIG. 4.
Figure 11:
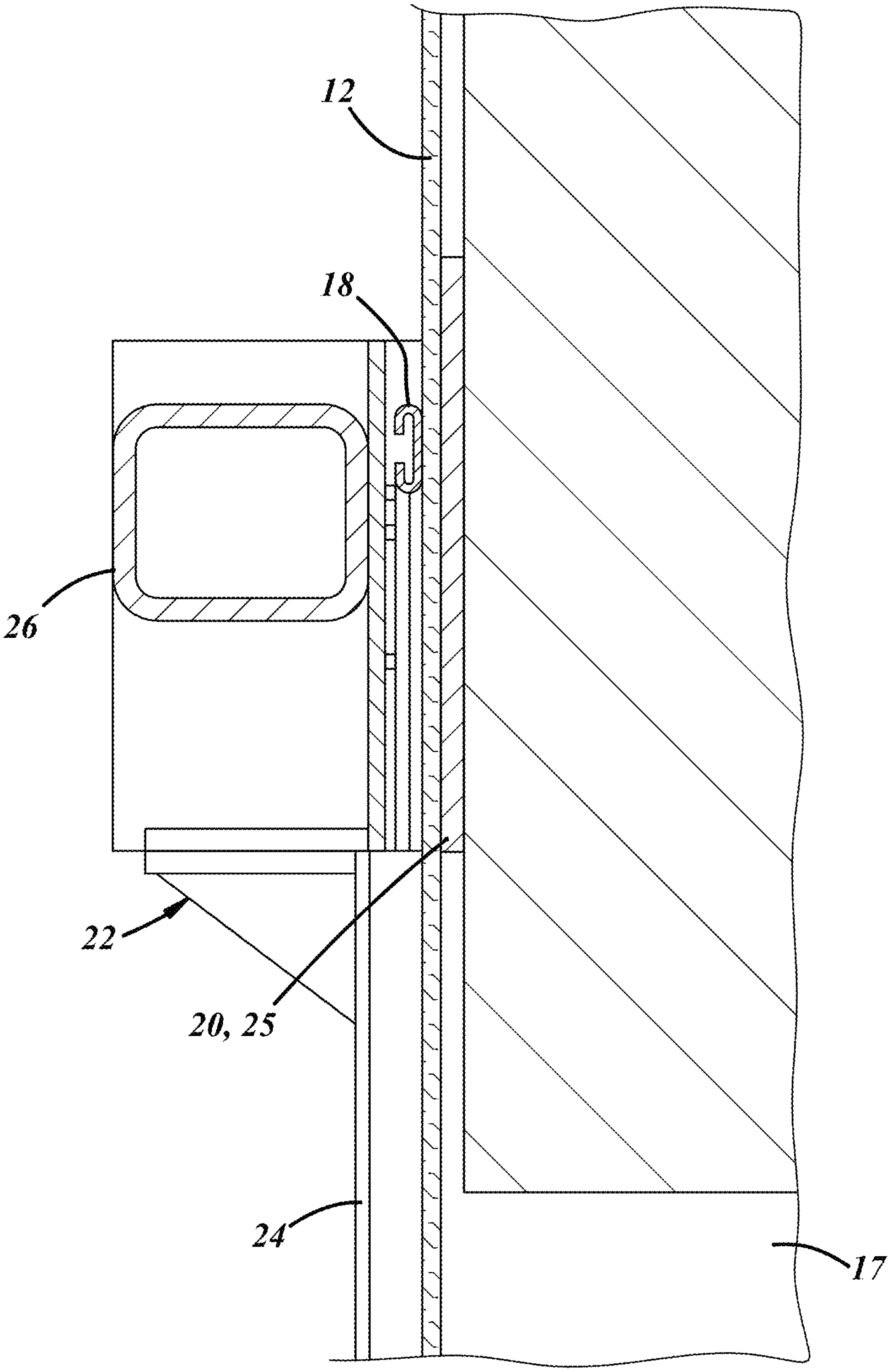
FIG. 11 is a side cross-section view of the upper half of the kiln closure frame of FIG. 10, with the spool out of view.

As best shown in FIGS. 7, 8, and 11, the expandable chamber 18 may comprise one or more inflatable fiber-reinforced polymer tubes (for example: tubes comprising nylon-reinforced rubber). In a preferred embodiment in which the expandable chamber 18 comprises a single tube, the expandable chamber tube 18 may be mounted on a closure frame 22 adjacent and spaced-from the kiln door frame 20, as best shown in FIGS. 7-11. And the expandable chamber tube 18 may be arranged to approximately ring a portion of the perimeter of the kiln opening 14 so that inflation of the chamber 18 (when the door 12 is covering the kiln opening 14) will press the door 12 away from the closure frame 22, and push the door 12 against the kiln door frame 20. This arrangement is shown in cross-section in FIGS. 7 and 8, with FIG. 7 showing the door 12 clamped between the inflated chamber 18 and the door frame 20, while FIG. 8 shows the chamber 18 deflated while the door is retracted out of view. In a preferred embodiment, and as best shown in FIGS. 4, 10, and 11, the closure frame 22 includes two side rails 24 and an upper crossbar 26 positioned to support the expandable chamber 18 to seal the door 12 against respective adjacent sides 23 and lintel 25 areas of the kiln door frame 20. In this preferred embodiment, the expandable chamber tube 18 may be supported along the side rails 24 and upper crossbar 26 of the closure frame 22.

The pressure door 12 may comprise a flexible material. In a preferred embodiment, this material may be a fiber-reinforced polymer such as a unidirectional nylon-reinforced rubber. This flexible material makes the door 12 easy to operate, however it also means that the door 12 will be subject to distortion due to pressure from within the kiln's interior 17 (shown in FIG. 3).

The expandable chamber 18 may therefore serve not only to seal the door 12 against outward pressure from the interior of the kiln 16, but also to create enough friction to prevent distortion of the door 12 from breaking the seal by pulling the edges of the door 12 inward. For this reason, the chamber 18 and pressure door 12 may comprise flexible materials selected to produce a sufficient coefficient of friction against one another, (once the door 12 closes off the kiln opening 14, and the chamber 18 inflates) to prevent the pressure differential generated by kiln operation from dislodging the door 12 from its clamped position between the kiln door frame 20 and expandable chamber 18. In an exemplary embodiment, this friction coefficient may be sufficient to withstand a relative kiln interior pressure of 0.15 to 0.30 psig across a pressure door 12 surface area of about 150 square feet with the expandable chamber 18 inflated to 45 psi or less. Pressure in the expandable chamber 18, when the chamber 18 is inflated, may also be adjusted to correspond to the relative kiln pressure.

In the preferred embodiment, the pressure door 12 is a roll-up type door that is configured and positioned to alternately unroll and roll-up between a deployed position covering the kiln opening 14 and a retracted position at least partially uncovering the kiln opening 14. According to this embodiment, at least a portion of the pressure door 12 is guided by side rails 24 mounted adjacent the kiln door frame 20 for vertical sliding motion between retracted and deployed positions, as best shown by FIGS. 2, 3, 7, and 8. These side rails 24 may be the side rails 24 of the closure frame 22. A spool 28 may be mounted atop an upper crossbar 26 of the closure frame 22 adjacent the kiln door frame 20, as best shown in FIG. 10. The spool 28 may be connected to the pressure door 12, and configured to roll the pressure door 12 onto itself when the pressure door 12 is moved from the deployed to the retracted position. The spool 28 may be driven by, and connected to, a drive motor 30. In a preferred embodiment and, to save space, this may be a planetary drive motor mounted inside the spool 28 itself, as shown in FIG. 10. However, any sort of drive motor 30 may be used, and the motor 30 may alternatively be mounted fully or partially outside the spool 28.

Figure 5:
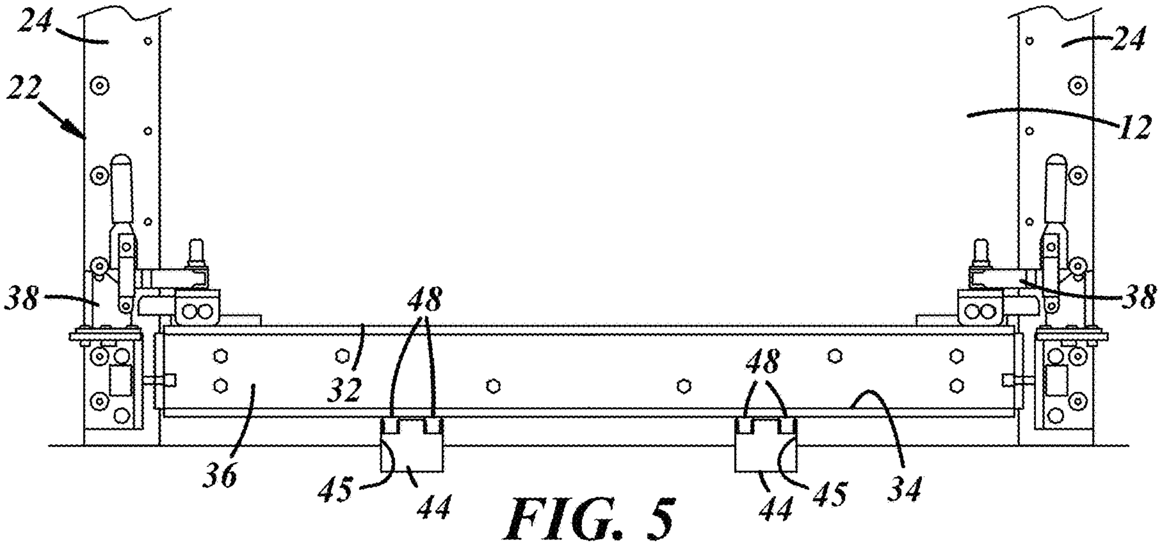
FIG. 5 is a detail view of a lower half of the kiln closure frame of FIG. 4, showing a bottom bar of the door clamped to the floor surface of the kiln.

To seal a bottom end 32 of the pressure door 12 against a floor surface 34 adjacent and across the kiln opening 14, the bottom end 32 of the pressure door 12 may be attached to a rigid base bar 36, and the apparatus 10 may comprise clamps 38 positioned to engage and clamp the base bar 36 to the floor 34 once the door 12 is in the deployed position, as best shown in FIGS. 5 and 7. A bottom surface 40 of the base bar 36 may comprise a bottom seal 42 positioned to be sandwiched between the base bar 36 and the floor 34 when the clamps 38 are engaged, as shown in FIG. 9. The bottom seal 42 may comprise an inflatable tube, or a passive gasket or door-sweep type seal. The door 12 may therefore be quickly sealed against the floor 34 by activation of the clamps 38 so that the base bar 36 holds the bottom end 32 of the door 12 sealed across the bottom of the kiln opening 14 while the expandable chamber 18 holds the door 12 sealed around the sides and top of the kiln opening 14.

Alternatively (or additionally), and as shown in FIG. 8, to seal the bottom of the door 12, the floor surface 34 adjacent the kiln opening 14 may comprise a recess 35 shaped to receive at least part of the expandable chamber 18, as well as the bottom end of the pressure door 12 when the pressure door 12 is in the deployed position. The expandable chamber 18 may partly extend into the recess 35 at or below the level of a portion of the floor surface 34 surrounding the recess 35, providing additional security.

Figure 6:
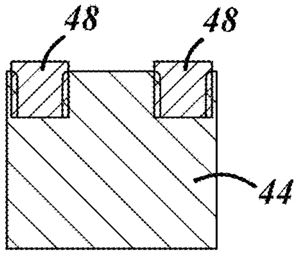
FIG. 6 is a detail cross-section view of a rail shown in FIGS. 1-3 and 5, including rail patches to seal gaps between the rail and adjacent floor surfaces.

The kiln 16 may be loaded and unloaded via rails 44 built into the floor surfaces 34 adjacent the kiln 16, and extending into the kiln interior 17, as shown in FIGS. 1-3. These rails 44 create gaps 45 in the floor surface 34 that are difficult for the base bar 36 to seal. To seal these gaps 45, the closure apparatus 10 may include rail patches 48, as best shown in detail by FIG. 6. The rail patches 48 may be shaped to fill the gaps 45 left between rails and floor surface 34, allowing the base bar 36 to seal against floor surface 34 and rails 44 when the rail patches 48 are installed, as shown in FIGS. 2 and 5. The rail patches 48 may be removed to allow the kiln 16 to be loaded or unloaded by rails 44, or alternatively, the rail patches 48 may be made of a resilient material that can re-expand after being crushed by wheels or flanges of rail traffic, allowing the rail patches 48 to be left permanently installed.

A pressurized kiln 16 including the closure apparatus 10 described above may be easily and quickly accessed for loading, unloading, or maintenance. Furthermore, the closure apparatus 10 itself may be retrofitted to a pressurized kiln to replace an existing door or hatch.

This description, rather than describing limitations of an invention, only illustrates embodiments of the invention recited in the claims. The language of this description is therefore exclusively descriptive and is non-limiting. Obviously, it's possible to modify this invention from what the description teaches. Within the scope of the claims, one may practice the invention other than as described above.

What is claimed is:

1. A concrete products curing kiln closure apparatus comprising:

a closure frame comprising an upper cross bar and two side rails connected at respective upper ends to opposite ends of the upper cross bar in an inverted U shape sized to position the cross bar and side rails generally parallel to and spaced from respective top and side edges of a kiln opening in a concrete products curing kiln when the closure frame is secured outside the kiln opening;

a pressure door carried by the closure frame and shaped to cover the kiln opening and to at least partially seal against a floor supporting the kiln and the closure frame when the pressure door is in a closed position; and at least one expandable chamber carried by the closure frame in a position to press against, and at least partially seal the pressure door against one or more outer kiln surfaces adjacent the kiln opening, when the expandable chamber is inflated and when the pressure door is in its closed position covering the kiln opening.

2. The kiln closure apparatus of claim 1 in which the closure apparatus is configured to seal a kiln sufficiently to maintain a positive gas pressure within the kiln relative to ambient air pressure outside the kiln when the at least one expandable chamber is inflated and pressurized air is introduced into the kiln.

3. The kiln closure apparatus of claim 2 in which the pressure door comprises a flexible material.

4. The kiln closure apparatus of claim 3 in which the flexible door material comprises a fiber-reinforced polymer.

5. The kiln closure apparatus of claim 4 in which the flexible door material comprises unidirectional nylon-reinforced rubber.

6. The kiln closure apparatus of claim 3 in which the at least one expandable chamber comprises a fiber reinforced polymer tube.

7. The kiln closure apparatus of claim 6 in which the tube comprises nylon-reinforced rubber.

8. The kiln closure apparatus of claim 1 in which the at least one expandable chamber comprises multiple inflatable tubes.

9. The kiln closure apparatus of claim 3 in which the at least one expandable chamber and pressure door comprise flexible materials having a sufficient coefficient of friction to prevent pressure differential generated by kiln operation from dislodging the door from the one or more outer kiln surfaces and expandable chamber when the door closes off the kiln opening and the at least one expandable chamber inflates.

10. The kiln closure apparatus of claim 3 in which the pressure door is configured and positioned to alternately unroll and roll-up between a deployed position covering the kiln opening and a retracted position at least partially uncovering the kiln opening.

11. The kiln closure apparatus of claim 10 in which:

at least a portion of the pressure door is slidably received in the side rails for sliding motion between retracted and deployed positions; and a spool is carried by the upper cross bar and connected to the pressure door and is configured to roll at least a portion of the pressure door onto itself when the pressure door is moved from the deployed to the retracted position.

12. The kiln closure apparatus of claim 11 in which an internal drive motor is drivingly connected to the spool.

13. The kiln closure apparatus of claim 11 in which an external drive motor is drivingly connected to the spool.

14. A concrete products curing kiln apparatus comprising:

a kiln enclosure resting on a floor;

a kiln opening formed in the kiln enclosure;

a closure frame comprising:

an upper cross bar disposed generally parallel to and spaced from an upper edge of the kiln opening, and two side rails connected at respective upper ends to respective outer ends of the upper cross bar in an inverted U shape, disposed generally parallel to and spaced from respective side edges of the kiln opening, and having respective lower ends resting on the floor adjacent the kiln opening;

a pressure door carried by the closure frame and comprising an air-impermeable material and shaped and positioned to cover the kiln opening when in a closed position; and an expandable chamber carried by the closure frame and inflatable to cause the chamber to expand and press on, and at least partially seal, outer edge regions of the pressure door against the outer surfaces of the kiln enclosure adjacent the kiln opening when the pressure door is in the closed position, the pressure door, in its closed position, being positioned as a barrier between the expandable chamber and heated interior kiln air.

15. The kiln apparatus of claim 14 in which the pressure door comprises a flexible material.

16. The kiln apparatus of claim 15 in which:

the pressure door comprises a roll-up door carried by the closure frame adjacent the kiln opening, respective side edges of the roll-up door being supported by the side rails for vertical sliding motion between retracted and closed positions; and a spool is carried by the closure frame upper cross bar adjacent the kiln opening and is connected to the pressure door and configured to roll the pressure door onto itself when the pressure door is moved from the closed to the retracted position.

17. The kiln apparatus of claim 16 in which:

a rigid base bar is carried by the pressure door adjacent and along a bottom edge of the pressure door;

the apparatus comprises clamps positioned to engage and clamp the base bar against a floor surface adjacent and extending along the kiln opening, when the pressure door is in the closed position; and a bottom seal is carried by and disposed along a bottom surface of the base bar and positioned to be sandwiched between the base bar and the floor surface when the clamps are engaged.

18. The kiln apparatus of claim 17 in which a lower edge of the pressure door is configured to be received into a complementary recess in a portion of the floor surface adjacent and extending along the kiln opening, when the pressure door is in the closed position.

19. A concrete products curing kiln closure apparatus comprising:

a pressure door shaped to cover a concrete products curing kiln opening;

a closure frame carrying the pressure door and comprising an upper cross bar and two side rails connected in an inverted U shape, respective lower ends of the side rails being mounted outside of the kiln such that the frame is positioned generally parallel to and spaced from the kiln opening;

at least one expandable chamber carried by the closure frame and inflatable to cause the chamber to expand, press against, and at least partially seal the pressure door against one or more outer kiln surfaces adjacent the kiln opening when the pressure door is covering the kiln opening;

a bottom seal attached along a bottom surface of the pressure door; and a clamp mounted and movable between:

a closed position applying force pressing the bottom seal downward against an upward-facing floor surface adjacent the kiln opening; and an open position leaving the upward-facing floor surface unimpeded for transit of concrete-products transportation vehicles in and out of the kiln.

* * * * *